May 2, 1967 R. W. ROBBINS, JR 3,317,181
FULLY SEALED, PRESSURE OPERATED METERING VALVE
Filed Aug. 24, 1965
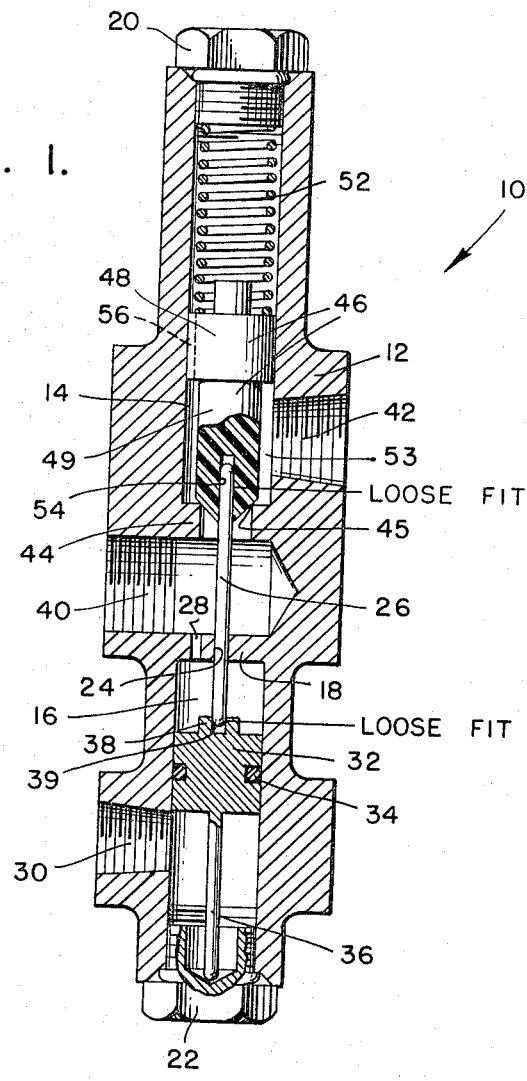
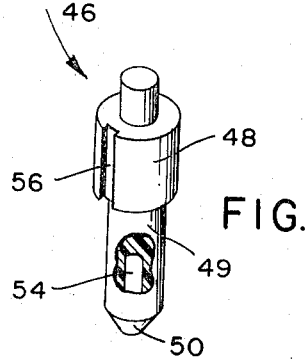
INVENTOR.
ROLAND W. ROBBINS, JR.
BY V. C. MULLER
ATTORNEY.

United States Patent Office 3,317,181
Patented May 2, 1967

3,317,181
FULLY SEALED, PRESSURE OPERATED METERING VALVE
Roland W. Robbins, Jr., China Lake, Calif., assignor to the United States of America as represented by the Secretary of the Navy
Filed Aug. 24, 1965, Ser. No. 482,306
5 Claims. (Cl. 251—62)

The invention described herein may be manufactured and used by or for the Government of the United States of America for governmental purposes without the payment of any royalties thereon or therefor.

This invention relates to a metering valve of the type in which the metering action is controlled by a separate fluid pressure signal. More particularly, the invention relates to such a metering valve which is further constructable as a unit totally sealed from the ambient environment.

A fluid signal controlled metering valve should provide predetermined calibrated response characteristics throughout its service life. As the result, it is the practice to avoid blind internal chambers which are subjected to variations in volume due to movement of the valve parts. Such a chamber may be formed, for example, at the non-working end of a control piston cylinder or at the non-working end of a poppet cylinder. Unless such blind chambers are avoided the entrapped air other other fluids which might enter the blind chambers as the result of slow seepage, can seriously interfere with the valve's calibrated response characteristics. The normal practice, for most uses of a valve, is to avoid blind chambers by simply providing vent passages to the ambient atmosphere. However, for some applications, such as where a valve is to operate submerged in a liquid, the valve must form a totally sealed unit, and the use of vent passages is not possible. The latter applications provide a difficult problem in valve construction.

An object of the invention is to provide a novel fluid pressure signal controlled metering valve unit, which is simple and inexpensive in construction, and which provides accurate and reliable response characteristics.

Another object of the invention is to provide a metering valve in accordance with the previous objective, and which further forms a totally sealed unit in which its blind internal chambers are pressure balanced relative to the fluid passing through the valve.

Other objects and many of the attendant advantages of this invention will be readily appreciated as the same becomes better understood by reference to the following detailed description when considered in connection with the accompanying drawings wherein:

FIG. 1 is a central section of valve appartus of the present invention; and

FIG. 2 is a perspective view of a component part of the apparatus of FIG. 1.

Referring now to the drawing, and particularly to FIG. 1, a pressure signal operated valve 10 comprises an elongated valve body 12 having a pair of axially aligned cylinder chambers consisting of a spring poppet chamber 14 and a control piston chamber 16. The inner ends of the chambers are separated by a transverse wall 18 formed as a portion of valve body 12. The outer end of poppet chamber 14 and the outer end of piston chamber 16 are closed by cap cuts 20 and 22, respectively.

A small bore 24 extends through transverse wall portion 18, and a connector rod 26 is disposed therein with a sliding fit. Opposite ends of the connector rod extend into both chambers 14 and 16. Another opening 28 extends through transverse wall portion 18, providing a pressure balancing passage between the inner end of chamber 14 and the inner end of chamber 16.

An inlet port 30 serves to receive the control pressure, and opens into chamber 16 at a zone thereof adjacent its outer end. A piston 32 is slideably disposed in chamber 16. An O-ring 34 is mounted in the slide surface of piston 32 to provide a fluid tight seal between it and the lateral wall of the chamber. Piston 32 has an integrally formed spacer rod 36 projecting from its lower face. The length of spacer rod 36 is so chosen that the body of the piston clears inlet port 30 when the end of the spacer rod portion abuts cap 22. A central circular lip 38 is formed on the upper end face of the piston element, and serves to form a short guide hole 39 to receive the end of connector rod 26. In absence of a pressure applied to port 30, the end of rod 26 extends into guide hole 39 with a sliding lateral fit, and with a loose axial fit relative to the bottom of the hole.

A radial port 40 enters the lateral wall of poppet chamber 14 at an axial position adjacent the inner end of the chamber. Another radial port 42 enters the wall of chamber 14 at a location in axially spaced relationship away from port 40. The lateral wall of chamber 14 forms a radially inwardly projecting annular protuberance 44 between ports 40 and 42. The upper axial side of protuberance 44 forms a planar surface transverse to the chamber axis, and the inner periphery of the protuberance forms a concentric cylindrical surface, so that a squared circular corner edge 45 is defined at the intersection of these surfaces.

A poppet 46 is disposed in chamber 14. Poppet 46 comprises a shank portion 48 which slideably engages the wall of chamber 14, and a reduced diameter portion 49 which extends from portion 48 in the direction toward the inner end of chamber 14. The inner end of poppet 46 is formed as a frustoconical face 50. A helical compression spring 52 is disposed in chamber 14 between cap 20 and poppet 46, where it acts to resiliently bias frustoconical surface 50 toward circular corner edge 45 of the annular protuberance. The valving action takes place between circular edge 45 and the frustoconical surface 50 of the poppet. Poppet 46 is preferably made of a material which is somewhat deformable under the high unit local pressure of the sharp circular edge 45 against surface 50. As a result, circular corner edge 45 will form its own ing-like seat or loci of engagement along frustoconical surface 50, and this seat will accurately conform to the shape of edge 45 irrespective of small dimensional irregularities in the fabrication or assembly of the parts. A preferred material from which to make poppet 46 is "Teflon," which as a Du Pont product otherwise defined as tetrafluoroethylene polymer, a plastic. The axial length of reduced diameter portion 49 of the poppet is so chosen that shank portion 48 clears port opening 42 when the frustoconical surface of the poppet engages the circular corner edge of protuberance 44. The diameter of reduced portion 49 of the poppet is less than the inside diameter of chamber 14, and greater than inside diameter of annular protuberance 44. This results in the formation of an annular space 53 between the reduced diameter portion of the poppet and the lateral wall of chamber 14. Annular space 53 serves as the passage communicating port 42 with the zone where circular corner edge 45 and frustoconical surface 50 cooperate to produce the valving action. An axially aligned, blind, guide hole 54 is formed in the central zone of frustoconical surface 50. Guide hole 54 serves to receive the upper end of connector rod 26 which engages the wall of the guide hole with a sliding fit. The depth of guide hole 54 is so chosen that the ends of rod 26 extends into same with a loose axial fit relative to the bottom of the hole. Shank portion 48 of poppet 46 has a longitudinal slot 56, formed in its outer periphery. Slot 56 extends between the axial ends of shank portion 48. Slot 56 provides a pressure balancing passage between annular space 53 and the outer end of chamber 14 where the spring 52 is disposed.

In operation, the control pressure is applied to port 30, and ports 40 and 42 are connected to the fluid line to flow through the valve. The control pressure acts against piston element 32. This, in turn, acts through connector rod 26 and displaces valve element 46 away from abutting engagement against shoulder 44. The frustoconical surface 50 is displaced from circular edge 45 by a magniture in accordance with a linear relationship to the control pressure, as determined by the spring constant of compressing spring 52. This displacement provides the metering of the flow between ports 40 and 42. Engagement of surface 50 against corner edge 45 provides the valve's shut-off condition.

Before any pressure is applied to control inlet port 30, the ends of rod 26 are disposed in loosely fitting axial relationship relative to the bottoms of guide holes 39 and 54. The initial application of pressure to port 30 places the connector rod in tight abutting relationship between piston 32 and poppet 46. This is the result of the upward force of the pressure against piston element 32 being opposed by the downward force of the spring bias acting against poppet 46. The connector rod thus acts as a rigid element in coupling forces between the piston and the valve element. This provides accurate and reliable valve response characteristics even in the critical "cracking" and "shut-off" stages of the valves operation.

An important feature of the invention is that the arrangement of the parts permits a fully sealed construction in which all blind chambers formed by moving parts may be pressure balanced to the fluid passing through the valve. Pressure balancing passage 28, which extends through transverse wall 18, balances the pressure at the inner end of chamber 16 to that present at port 40. Slot 56 in the peripheral surface of shank portion 48 of poppet 56, balances the pressure in the outer end of chamber 14 to that present in annular space 53, and in turn to that at port 42. This results in the provision of a valve having predetermined response characteristics which can not be affected by the fluids in the otherwise blind ends of chambers 14 and 16.

Another important feature is that valve 10 is relatively inexpensive to fabricate and manufacture. The parts require no more than ordinary production manufacturing tolerances. The ease of assembly of the parts is greatly enhanced by the basic arrangement of coupling forces between piston 32 and poppet 46 by sliding rod 26, which is held in alignment by guide bore 24, and by the loose axial fit of rod 26 relative to the bottom of guide holes 39 and 54. The parts need merely to be inserted in the chambers from their respective outer ends, and the chambers closed by cap screws 20 and 22, without need for final manufacturing adjustments.

Obviously many modifications and variations of the present invention are possible in the light of the above teachings. It is therefore to be understood that within the scope of the appended claims the invention may be practiced otherwise than as specifically described.

What is claimed is:
1. A pressure signal controlled metering valve, comprising;
  (a) a housing member forming first and second axially aligned, generally cylindrical cavities consisting of a control piston cavity and a valve element cavity, said cavities having their adjacent ends separated by a transverse barrier wall forming the inner end walls of said first and second cavities, said barrier wall having a first opening extending therethrough forming a connector rod guide bore aligned along the axis of the cavities, said first and second cavities each being closed at their respective outer ends by an end wall,
  (b) a connector rod of predetermined length disposed in said connector rod guide bore in sliding engagement therewith, one end of the connector rod projecting into the first cavity and the other end projecting into the second cavity,
  (c) a first control pressure port formed in said housing member for receiving a valve control pressure signal, said first port opening into the lateral wall of said first cavity and communicating with the interior thereof at a zone thereof adjacent its outer end,
  (d) a piston disposed in said first cavity and in sliding engagement with the lateral wall thereof, said piston having first and second faces confronting the inner and outer end walls of the first cavity, respectively, said piston having an axially aligned spacer rod projecting from its second face, said spacer rod having a predetermined length to cooperate with the outer end wall of the first cavity to define a piston limit position in which the piston is axially clear of the first port, said piston having a first blind guide hole for slideably receiving the end of the connector rod,
  (e) second and third valve ports formed in said housing member and opening into the lateral wall of said second cavity and communicating with the interior thereof,
  (f) a cylindrical valve element disposed in said second cavity and in sliding engagement with the lateral wall thereof, said valve element having first and second ends confronting the inner and outer end walls of the first cavity, respectively, said valve element having a second blind guide hole for slideably receiving the end of the connector rod, said second guide hole being formed in the first end of the valve element, the construction and arrangement of the valve element and the housing member being such that the valve element has a predetermined axial limit position in the direction toward the inner end of the second cavity in which is blocks communication between the second and third ports.
  (g) a helical compression spring disposed in said second chamber between the outer end wall and the second end of the valve element to resiliently bias same toward said limit position.
2. Apparatus in accordance with claim 1,
  (h) said second port opening into the second cavity adjacent its inner end, said third port opening into said second cavity at a location axially spaced from the second cavity in the direction toward the outer end,
  (i) said lateral wall of said second cavity between the second and third ports forming a radially inwardly projecting annular protuberance,
  (j) said valve element having a shank portion adjacent its second end for engagement with the lateral wall of the cavity, and a reduced diameter portion extending axially from the shank portion in the direction toward the inner end of the cavity, said reduced diameter portion of the valve element having a diameter less than the diameter of the shank portion and greater than the inside diameter of said annular protuberance, said first end of the valve member forming a concentric abutment loci for engagement with said annular protuberance to define the closed position of the valve element, said reduced diameter portion of the valve element being of predetermined length to space said shank portion axially clear of the third port in the closed position of the valve member.
3. Apparatus in accordance with claim 2, wherein
  (k) the radial side of the annular protuberance adjacent the valve element forms a transverse planar surface and the inner periphery of said protuberance forms a concentric cylindrical surface, said transverse and cylindrical surface intersection to define a squared circular corner edge, and
  (l) the first end of the valve element forms a frusto- conical poppet surface disposed about the blind guide hole and in confronting relationship to the circular corner edge of the annular protuberance, said first end of the valve element forming the frustoconical surface being made of a somewhat deformable material to conform to said circular corner edge to form a tight seal for same in the closed position of the valve element.

4. Apparatus in accordance with claim 2,
 (m) a second non-axial opening formed in said transverse barrier wall between the first and second cavities to balance the pressure at the inner end of the first cavity to the pressure at said second port, and
 (n) a longitudinal slot formed in the outer peripheral surface of the shank portion of the valve member to balance the pressure at the outer end of the second cavity to the pressure at said third port.

5. Apparatus in accordance with claim 2,
 (o) said end walls at the outer ends of said first and second cavities being formed by cap screws,
 (p) said blind guide holes formed in the piston and in the valve member being of such depths, respectively, that the connector rod ends are disposed therein in a loose axially fit relative to the bottoms of the respective guide holes, in absence of a pressure applied to the first port.

References Cited by the Examiner
UNITED STATES PATENTS

| | | | |
|---|---|---|---|
| 1,947,742 | 2/1934 | Schellens | 251—62 |
| 2,410,375 | 10/1946 | Wright | 251—62 |

M. CARY NELSON, *Primary Examiner.*

A. ROSENTHAL, *Assistant Examiner.*